US008370905B2

(12) United States Patent
Sangubhatla (10) Patent No.: US 8,370,905 B2
(45) Date of Patent: Feb. 5, 2013

(54) DOMAIN ACCESS SYSTEM (75) Inventor: Murali Sangubhatla, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/777,266

(22) Filed: May 11, 2010

(65) Prior Publication Data
US 2011/0283104 A1    Nov. 17, 2011

(51) Int. Cl.
*H04L 29/06* (2006.01)
(52) U.S. Cl. ............. 726/4; 726/2; 726/3; 726/5; 726/6; 726/7; 713/168; 726/10
(58) Field of Classification Search .................. 713/168; 709/222; 726/7
See application file for complete search history.

(56) References Cited

U.S. PATENT DOCUMENTS

| 5,757,920 | A * | 5/1998 | Misra et al. ................. 713/158 |
| 5,953,389 | A | 9/1999 | Pruett et al. |
| 7,036,142 | B1 * | 4/2006 | Zhang et al. .................... 726/12 |
| 7,571,467 | B1 * | 8/2009 | Priestley et al. .................. 726/6 |
| 7,669,235 | B2 * | 2/2010 | Hunt et al. ....................... 726/18 |
| 8,112,789 | B2 * | 2/2012 | Halls et al. ........................ 726/4 |
| 2003/0051021 | A1 | 3/2003 | Hirschfeld et al. |
| 2006/0155667 | A1 | 7/2006 | Tolba |
| 2007/0118646 | A1 * | 5/2007 | Gassoway ..................... 709/225 |
| 2008/0005290 | A1 * | 1/2008 | Nykanen et al. .............. 709/222 |
| 2008/0091448 | A1 | 4/2008 | Niheu et al. |
| 2008/0209207 | A1 * | 8/2008 | Parupudi et al. ............. 713/156 |
| 2008/0256607 | A1 | 10/2008 | Janedittakarn et al. |
| 2008/0263629 | A1 * | 10/2008 | Anderson ......................... 726/2 |
| 2008/0320566 | A1 * | 12/2008 | Herzog et al. .................... 726/4 |
| 2010/0037207 | A1 * | 2/2010 | Chambers et al. ............ 717/121 |
| 2010/0088761 | A1 * | 4/2010 | Podjarny et al. ................. 726/22 |
| 2011/0107401 | A1 * | 5/2011 | Bhai et al. .......................... 726/4 |
| 2012/0185696 | A1 * | 7/2012 | Lortz et al. .................... 713/175 |

OTHER PUBLICATIONS

Dodani, Mahesh H., "The Silver Lining of Cloud Computing", Retrieved at << http://www.jot.fm/issues/issue_2009_03/column3.pdf , In Journal of Object Technology, vol. 8, No. 2, Mar.-Apr. 2009, pp. 29-38.
Mercer, Nathan., "Nathan Mercer's Blog", Retrieved at << http://blogs.technet.com/nmercer/default.aspx?p=2 >>, Retrieved Date: Mar. 8, 2010, pp. 18.
"Enterprise Products: Windows 7", Retrieved at << http://www.microsoft.com/windows/enterprise/products/directaccess.aspx?pf=true >>, Retrieved Date: Mar. 5, 2010, pp. 3.
"Offline Domain Join (Djoin.exe) Step-by-Step Guide", Retrieved at << http://technet.microsoft.com/en-us/library/offline-domain-join-djoin-step-by-step%28WS.10%29.aspx >>, Retrieved Date: May 6, 2010, pp. 9.
Lent, Arthur "NetApp vStorage Integration: Intelligent Data Management for VMware", Tech OnTap, Mar. 2009, NetApp, pp. 9.
Goldberg, Edward M., "How to Leverage Amazon AWS RDS today", Cloud Software Development Blogs, Retrieved from http://www.cloudvoices.com/aggregator/2010/go/appistry-predicts-2010?page=44 on Mar. 8, 2010, pp. 6.

* cited by examiner

*Primary Examiner* — Jeffrey Pwu
*Assistant Examiner* — William Corum, Jr.
(74) *Attorney, Agent, or Firm* — Rau Patents, LLC (57) ABSTRACT

A domain access system may include a connection package for a remote device. The connection package may be installed and used to connect to a domain without having to be physically attached to the domain. The connection package may include a domain identifier and a machine name, as well as certificates used to authenticate the device to the domain, group policies, and other components and configuration information. An installation program may configure the remote device with the various components and certificates so that the remote device may connect to the domain.

16 Claims, 4 Drawing Sheets

DOMAIN ACCESS SYSTEM

BACKGROUND

Accessing a computer network domain allows computers to communicate within a controlled network, such as a company or other enterprise. Within the domain, connected computers may share resources, such as file systems, databases, printers, and other resources. Many domains may have management systems that may manage computer configurations, updates, security systems, and other management functions.

In many scenarios, a user may wish to access the domain from a remote location. For example, a salesperson may wish to connect to a company domain when travelling, or a student may wish to access a university domain from an apartment.

SUMMARY

A domain access system may include a connection package for a remote device. The connection package may be installed and used to connect to a domain without having to be physically attached to the domain. The connection package may include a domain identifier and a machine name, as well as certificates used to authenticate the device to the domain, group policies, and other components and configuration information. An installation program may configure the remote device with the various components and certificates so that the remote device may connect to the domain.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A remote device may be added to a domain by providing an installation package that contains domain join information, group polices, and certificates to the remote device. The domain join information and certificates may be configured for a specific device and may correspond with a device account within the domain.

An installation program may configure the remote device using the installation package. Once configured, the remote device may be able to join the domain and operate as part of the domain even though the device is located outside of the physical environment of the domain.

The installation package may be created at the domain and may include information that is customized for the domain. The domain join information may include account passwords for the domain, the domain name, the name of a domain controller, security identification of the domain, and other information. The certificates may include certificates issued by a domain controller that may be used to authenticate the remote device.

The installation package may be transmitted to the remote device using a secure transport mechanism. In some cases, the installation package may be encrypted and may be opened using various authentication mechanisms, such as password control, smartcard authentication, or other mechanism. Once accessed, an installation application may configure the remote device with the various components. After installation, the remote device may automatically connect to the domain. Once joined to the domain, the remote device may appear within the local domain and be accessed by other devices, and the remote device may have access to various devices and services within the domain.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
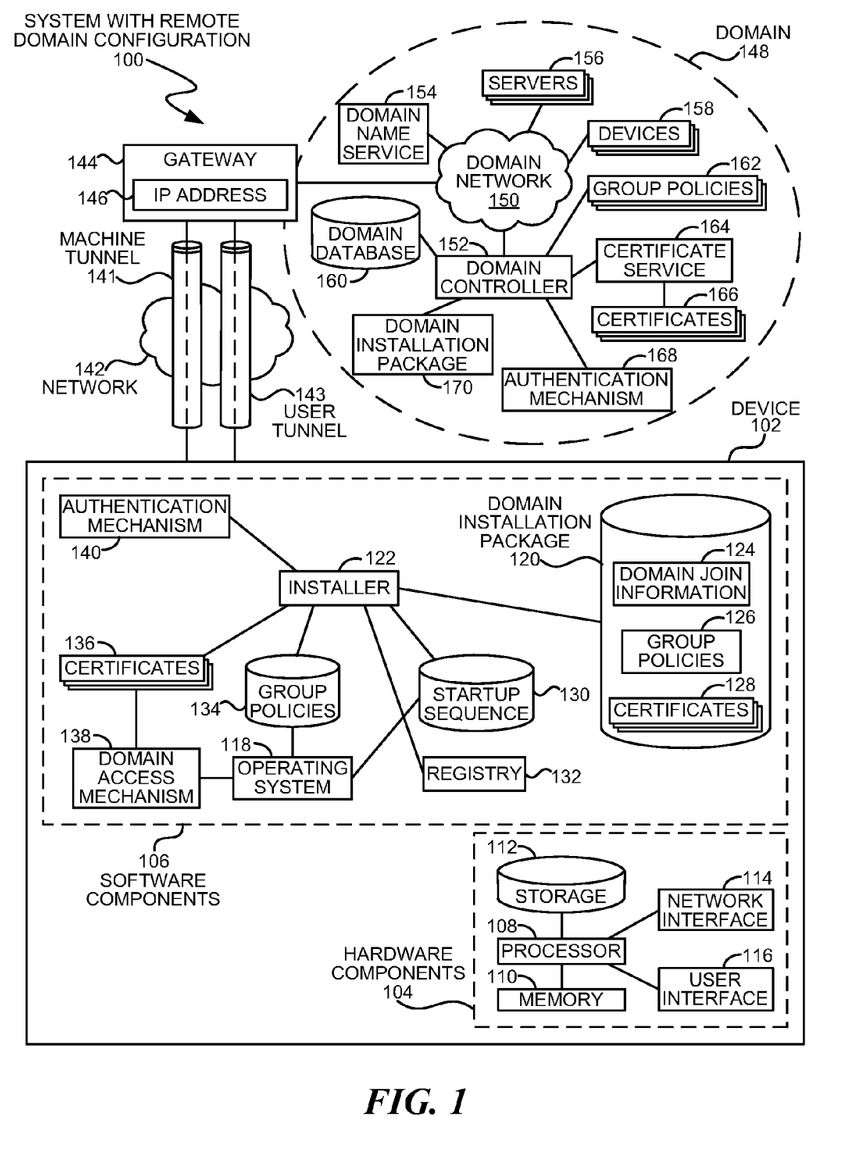
FIG. 1 is a diagram illustration of an embodiment showing a system with remote domain configuration.

FIG. 1 is a diagram of an embodiment 100, showing a system with remote domain join. Embodiment 100 is a simplified example of a system that may generate a domain installation package that may be remotely installed and enable a device to connect to a domain.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system in which a domain installation package may be created within a domain, and then the domain installation package may be installed on a remote device unattached to the domain. Once installed, the remote device may be able to connect to the domain in a secure manner and access the domain.

In one use scenario, a domain may be established for a company with several users who work remotely. The domain installation package may be created inside the domain and transmitted to the remote users who may install the package on their computers. These remote computers may be able to automatically connect to and join the domain using the information in the domain installation package.

A domain may be a computer network that may operate in a controlled environment. In a typical architecture, one or more server computers may operate as domain controllers and may provide various management services to the machines connected to the network. In many cases, a domain may have centralized authentication mechanism that may verify login credentials, as well as a Domain Name Service (DNS) that may provide name services for machines attached to the domain.

The centralized authentication mechanism may use Kerberos or other authentication mechanism so that devices within the domain may authenticate to each other. When a new machine attempts to join the domain, the new device may present credentials. The credentials may be a machine account and a machine password, as well as authentication certificates that may be used to digitally sign a transmission.

In many domain systems, a set of domain join information may be created to allow machines to join the domain. When a machine is directly attached to the domain, a newly added machine may connect to a domain server directly with a user's credentials. As part of the joining process, the domain server may create a machine account for the device and transmit the machine account information to the machine. The machine account information may include a machine identifier, machine password, and other information.

The device 102 may represent a typical computer device, such as a desktop computer or server, having hardware components 104 and software components 106. In some embodiments, the device 102 may be a laptop computer, netbook computer, tablet computer, mobile telephone, handheld personal digital assistant, game console, network appliance, or any other computing device.

The architecture illustrated for device 102 may represent a typical architecture with hardware and software components; however, other architectures may be used to implement some or all of the distributed database system.

The hardware components 104 may include a processor 108, random access memory 110, and nonvolatile storage 112. The hardware components 104 may also include a network interface 114 and a user interface 116.

The software components 106 may include an operating system 118 on which various applications may execute, including an installer 122 that may install a domain installation package 120. The domain installation package 120 may include domain join information 124, a set of group policies 126, and a set of certificates. The installer 122 may configure the device 102 so that the device may automatically establish a connection to a domain and connect to the domain.

The domain installation package 120 may contain much of the information that may be used to join a domain. The installer 122 may configure the device 102 with the information contained in the domain installation package, which may affect two general areas: establishing credentials for joining the domain and configuring the device 102 to automatically connect to the domain.

The domain join information 124 may contain most or all of the information that may be used to join the domain when the device 102 is connected to the domain. The group policies 126 and certificates 128 may contain the information used to automatically connect to the domain. In some embodiments, the group policies 126 and certificates 128 may also be used to join to the domain.

In order to configure the device 102 to join the domain, the installer may add information to an operating system startup sequence 130 that may cause the device 102 to start up in a domain mode. The information may include setting a machine name for the device 102, as well as various parameters for the domain, such as the domain identifier.

Some operating systems may not enable a device to be configured for a domain after the device is started and may only configure various domain settings during startup. In such embodiments, the installer 122 may modify the startup sequence 130 of the device 102 with various parameters, settings, and sometimes executable sequences to cause the device 102 to startup in a configuration that may allow connection to a domain.

Some operating systems may have a startup sequence 130 that may be a set of processes that execute during the startup operations of the operating system. In some cases, such processes may be a process that executes every time the operating system starts, and in other cases, such processes may be execute only once and then not again during subsequent startups. One use for such a process may be to perform some configuration operation prior to other processes starting, for example.

The installer 122 may place one or more executable scripts, processes, programs, or other executable elements into a startup sequence 130. Some such executable elements may be executed each time the operating system starts up. In some cases, such executable elements may execute one time and may not be executed again.

In some embodiments, the installer 122 may make changes to settings in a registry 132, configuration files, group policies 134, or other locations. Some such settings may be read during the startup of the operating system 118, while other settings may have an effect as soon as the settings are changed.

The installer 122 may install changes to the registry 132 and group policies 134 that enable a remote connection to a domain. Some of the registry settings 132 and group policies 134 may include connection information to a domain. The connection information may include information to allow the device to connect to a domain as well as information to allow a user to connect to a domain.

The installer 122 may install one or more certificates 128 in a certificate management system that may have existing certificates 136. The certificates 128 may be used to authenticate the device to the domain. In some cases, the certificates 128 may be used to encrypt or decrypt communications between the device 102 and a domain.

The installer 122 may operate with an authentication mechanism 140 to permit or deny access to the domain installation package 120. In many cases, the domain installation package 120 may contain sensitive information that may allow access to a domain. As such, various protection mechanisms may be applied to the domain installation package 120, such as password protections, smartcard mechanisms, or other such systems. The authentication mechanism 140 may be used to verify credentials that may permit access to the domain installation package 120. In some cases, the authentication mechanism 140 may permit access to make the various changes to the device 102, such as changing the registry 132 or components used in the startup sequence 130.

The device 102 may connect to the domain 148 through a gateway 144, which may have an Internet Protocol (IP) address 146. The gateway 144 may the outward facing access point for a domain 148 from a network 142. The network 142 may be the Internet or other wide area network.

Within the domain 148 may be the domain network 150 which may include a domain controller 152, a domain name service 154, various servers 156, and other devices 158. In a small business, for example, a domain may have a single domain controller 152 and a dozen or more devices 158. In a large enterprise, a domain may have many domain controllers 152 and thousands of servers 156 and tens of thousands of devices 158.

The domain controller 152 as illustrated may provide multiple services. In larger scale embodiments, several domain controllers 152 may each provide one of the various services. In some such embodiments, two or more domain controllers may provide the same service in a redundant or load balancing configuration.

The domain controller 152 may maintain a domain database 160 that may contain user and machine accounts for each authorized user and machine. A machine account may describe a machine to the domain and assign various permissions or access rules for the device. For example, some devices may be accessed by certain other devices or certain other users and may not be permitted from other devices or users.

When the device 102 connects to the domain 148, the connections to a domain may come in two stages. In the first stage, the device 102 may establish a connection between the remote device 102 and the domain. In the second stage, the user may establish a connection to the domain.

In the first stage, the device 102 may establish a machine tunnel 141 to the gateway 144. The machine tunnel 141 may be a secure communications tunnel that allows encrypted communication between the device 102 and the gateway 144. When the machine tunnel 141 is established, the device 102 may attempt to connect to the domain using a machine name and a machine password.

The machine tunnel 141 may be created using Internet Protocol Security (IPSec) or other protocol for mutual authentication between the device 102 and the gateway 144. IPSec or a similar protocol may have an end to end tunneling mechanism that may pass encrypted communications between the device 102 and gateway 144.

IPSec and similar technologies may be built on Internet Protocol Version 6 (IPv6). When the network 142 is an Internet Protocol Version 4 (IPv4) network, various technologies such as 6 to 4 may be used to connect IPv6 devices through an IPv4 network. 6 to 4 may be a protocol useful for connecting an IPv6 device to a gateway 144 that may have an IPv4 address.

In some embodiments, Teredo may be used as a tunneling protocol between the device 102 and the gateway 144 or, in some cases, to the domain controller 152. In some such embodiments, the gateway 144 may be a network address translator (NAT) device.

When the machine tunnel 141 is established, the domain controller 152 may access the device 102 and may permit other devices to access the device 102. For example, the device 102 may have a file system or other service that may be accessed by other devices. In some cases, the domain controller 152 may transmit group policies 162 when the device 102 connects to the domain 148, query the device 102 for health characteristics, provide updates to the device 102, or perform other management functions.

The second stage of connection may create a user tunnel 143 through which a user may access the domain 148. A user may provide credentials in the form of a smartcard, password, biometric scan, or other credential, and those credentials may be passed to the domain controller 152. The user may be authenticated to the domain and given access to services and devices on the domain.

The two stage connection mechanism may allow a device to connect to the network prior to a user authenticating to the network. In a typical use scenario, the device 102 may be turned on and may automatically attempt to connect to the domain 148. During the connection, the device 102 may receive any updates, changes to group policies, and otherwise become active on the domain 148. In such a state, the device may be managed by the domain controller 152.

After the device 102 is connected to the domain 148 through the machine tunnel 141, the user may log into the device 102. Since the device 102 is already connected to the domain 148, the user credentials may be authenticated by the domain controller 152 and the authentication service 168.

The domain installation package 120 may be created by a domain controller 152 to create a domain installation package 170. The domain installation package 170 may be encrypted or otherwise protected and sent to the device 102. For example, a Digital Versatile Disk (DVD) or flash memory device may be created to store the domain installation package 170 and physically transported to the device 102 for installation. In many cases, the installer 122 may also be stored on the storage device by the domain controller 152.

The domain controller 152 may create a machine account for the device 102 in the domain database 160 and may provision services for the device 102. After creating the machine account, domain controller 152 may create the domain join information 124, which may include the machine account information as well as domain information, such as the domain identifier and other information used to connect to the domain. The domain join information may be added to the domain installation package 170.

The domain controller 152 may identify the various group policies 162 that may be used to establish the machine tunnel 141 and user tunnel 143, as well as other group policies that may be used to establish connection to the domain 148 and operate as part of the domain 148. Such group policies may be stored in the domain installation package 170.

The domain controller 152 may operate or have access to various certificate services 164. The certificate services 164 may create an authentication certificate 166 that may be used by the device 102 to authenticate to the domain 148. The certificate services 164 may also create certificates 166 that may be used for encryption and decryption operations. The certificates for the device 102 may be stored in the domain installation package 170.

Once the domain installation package 170 is created, it may be transported to the remote device 102 and installed by the installer. After installation, the remote device 102 may automatically connect to the domain 148 whenever a network connection is available.

Figure 2:
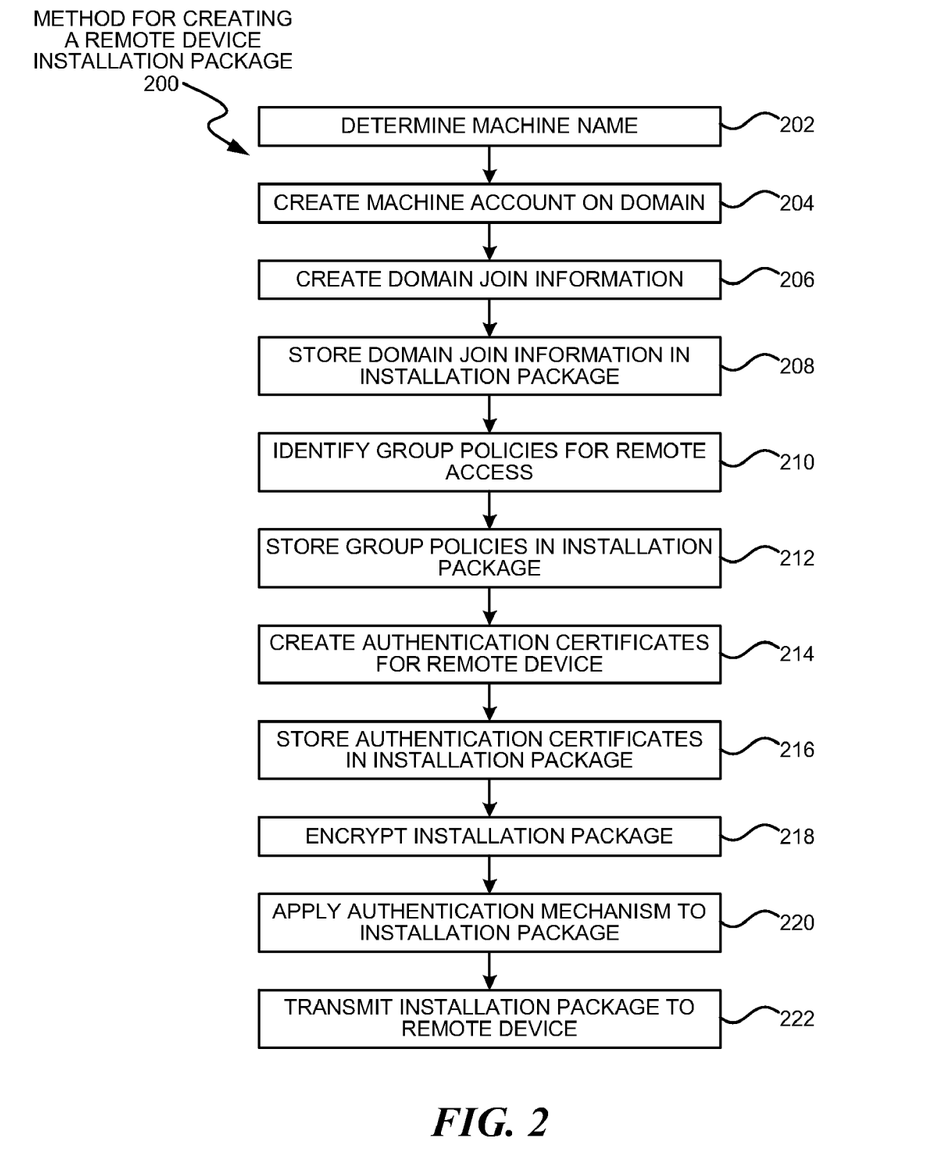
FIG. 2 is a flowchart illustration of an embodiment showing a method for creating a remote device installation package.

FIG. 2 is a flowchart illustration of an embodiment 200 showing a method for creating a remote device installation package. The operations of embodiment 200 may be performed by a domain controller or other device attached to a domain, such as the domain controller 152 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a simplified process that may be performed by a domain connected device to create a domain installation package. The domain installation package may contain all of the information that may be used to configure a remote device for connection to a domain.

In block 202, the machine name may be determined and a machine account may be created in block 204. The machine account may define a common name, which may be a human readable string, for example. The machine account may also define a unique name, which may be a Globally Unique Identifier (GUID) or other name that may be used to specifically identify the device associated with the account. The use of a GUID or other unique name may allow two or more devices to share the same common name.

In some embodiments, a specific identifier may be entered to uniquely identify the machine. For example, a manufacturer's serial number or other identifier may be entered to identify the device. In some embodiments, a Media Access Control (MAC) address or other hardware-specific identifier of the remote device may be used.

In some embodiments, no hardware-specific identifier for the machine may be used when creating the machine account. Such an embodiment may be useful in the case where a remote device may not be present or may not even been constructed at the time the machine account is created.

In one use scenario, an original equipment manufacturer (OEM) may preconfigure a device for remote access to a domain. As part of the manufacturing process, the OEM may install a domain installation package and ship the device and a domain installation package to a user. When the user initializes the device, the installation process may configure the device for access to the domain. In such a use scenario, a domain controller may generate a domain installation package beforehand and may not have access to any hardware-specific identifiers.

Once the machine account is created and properly provisioned in block 204, the domain join information may be created. The domain join information may include information relating to the domain information, including any domain identifiers, machine account identifier, machine account password and other authentication credentials, and any other information that may be used to join the domain.

The domain join information may be added to the installation package in block 208.

Group policies relating to the remote access of the device to the domain may be identified in block 210 and stored in the installation package in block 212. The group policies may include addresses for the domain, settings used to establish a machine tunnel and a user tunnel to the domain, communication settings, or any other configuration settings.

Authentication certificates may be created in block 214. The certificates may include authentication certificates used to authenticate the machine to the domain, as well as certificates that may be used for encrypting and decrypting communications. The certificates may be added to the installation package in block 216.

The installation package may be encrypted in block 218 and an authentication mechanism may be applied to the installation package in block 220. The authentication mechanism may be a password protection, smartcard protection, or other mechanism.

The installation package may be transmitted to the remote device in block 222.

Figure 3:
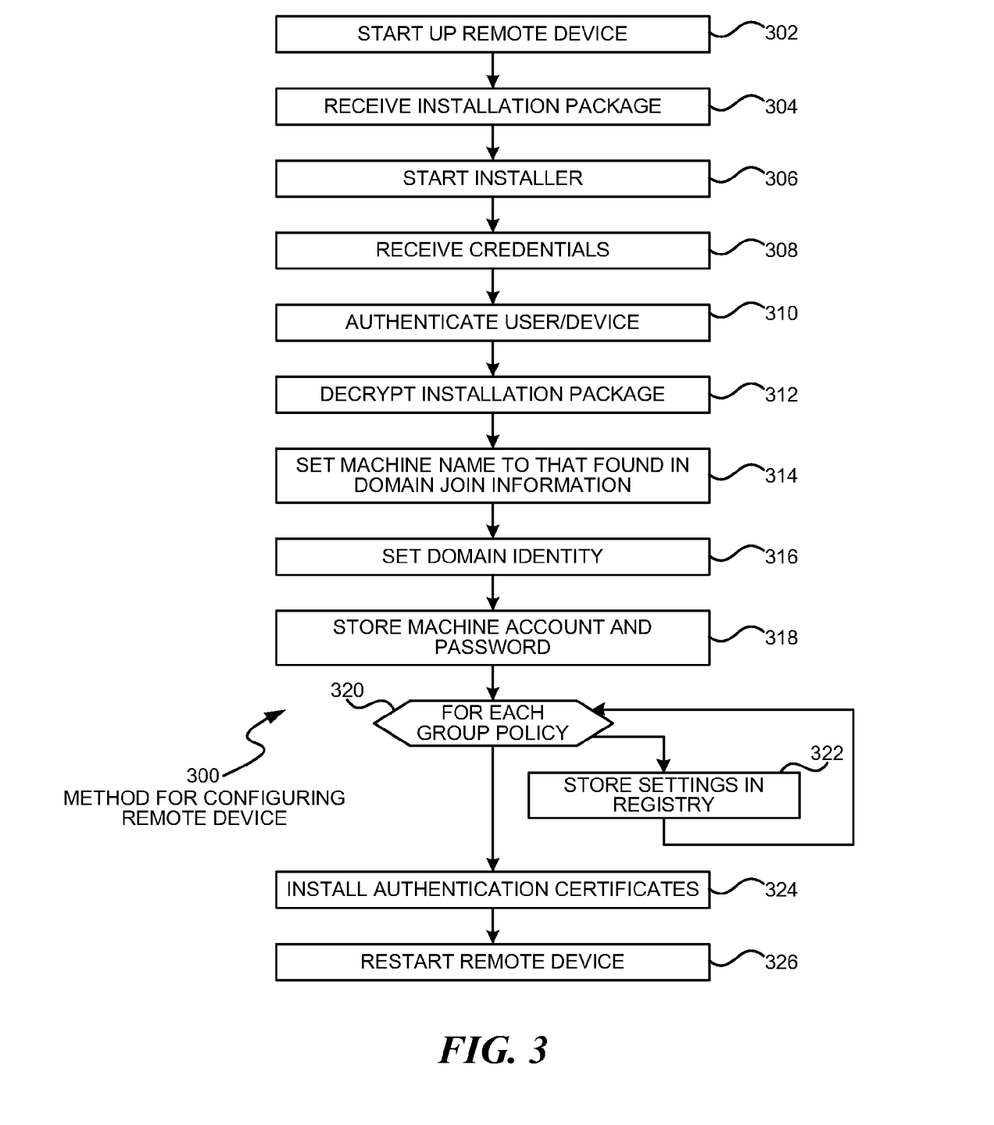
FIG. 3 is a flowchart illustration of an embodiment showing a method for configuring a remote device.

FIG. 3 is a flowchart illustration of an embodiment 300 showing a method for configuring a remote device using the domain installation package that may be created in embodiment 200. The operations of embodiment 200 may be that of an installing application, such as the installer 122 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates one method by which a domain installation package may be used to configure a remote device.

The remote device may be started in block 302 and an installation package received in block 304. An installer may be started in block 306.

Credentials may be received in block 308 and used to authenticate the user and device in block 310.

In some embodiments, the credentials used to authenticate the installation package may include a hardware-specific identifier. For example, a domain installation package may be accessed using a user-specific identifier such as a password or smart card as well as verifying a MAC address associated with the device or a hardware serial number. In order to access the installation package in such an example, both the hardware-specific identifiers and user-specific identifiers may be present to gain access.

Once the authentication is performed in block 310, the domain installation package may be decrypted in block 312.

Using the domain join information stored in the domain installation package, the machine name may be set in block 314 and the domain identity may be set in block 316. The machine account and password may be stored in block 318.

For each group policy element in block 320, the settings may be stored in the registry in block 322.

After installing the authentication certificates in block 324, the remote device may be restarted in block 326.

Figure 4:
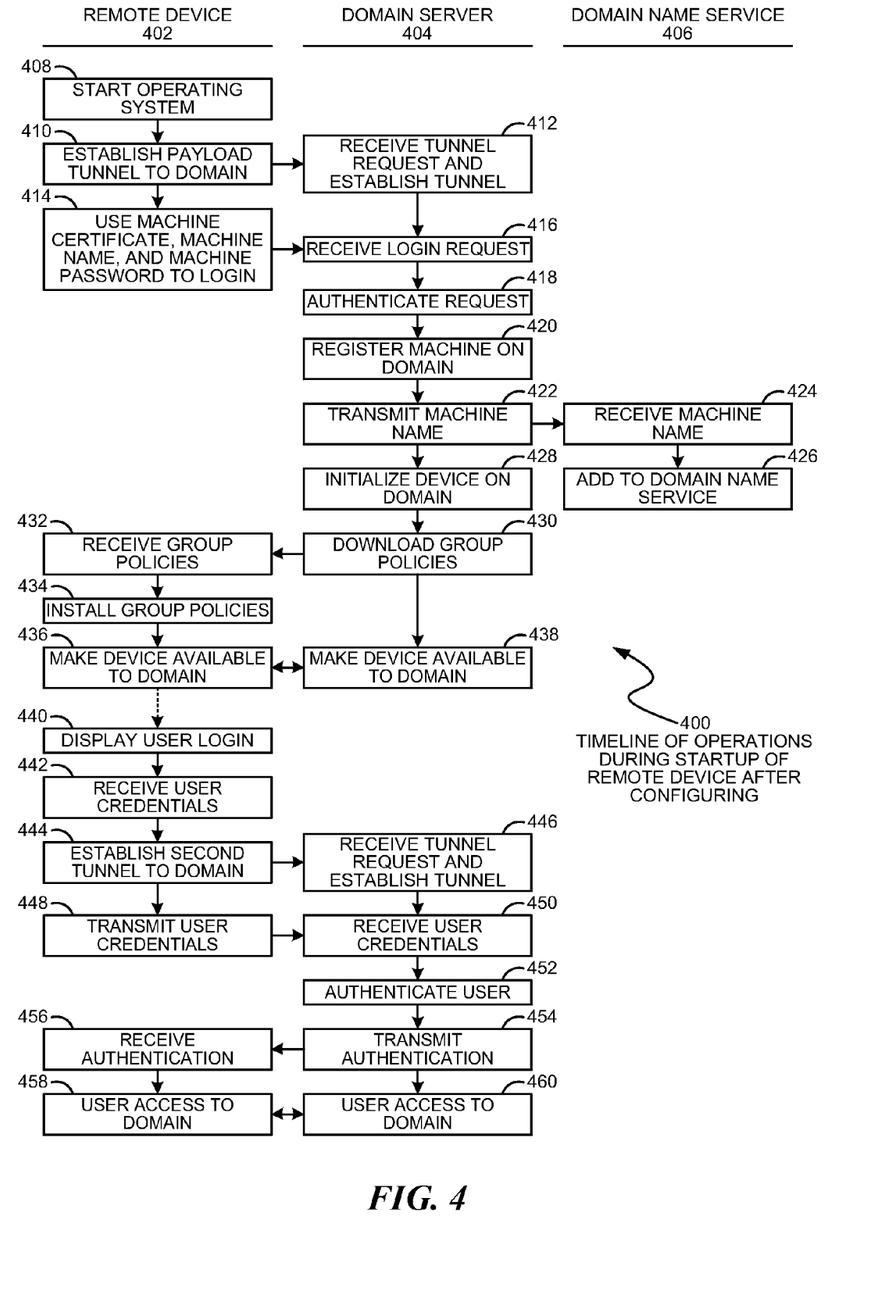
FIG. 4 is a timeline illustration of an embodiment showing a method for operating a remote device during startup and normal operations.

FIG. 4 is a timeline illustration of an embodiment 400 showing actions and interactions between a remote device 402, a domain server 404, and a domain name service 406. Embodiment 400 may represent operations performed by a remote device and a domain server when the remote device starts up, connects to the domain, and operates as part of the domain. The operations of the remote device 402 are illustrated in the left hand column, the operations of the domain server 404 are illustrated in the center column, and the operations of the domain name service 406 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The remote device 402 may begin by starting the operating system in block 408. As part of the startup sequence, the remote device 402 may initiate a payload tunnel to the domain in block 410. The configuration settings for the payload tunnel may be stored in the registry, configuration files, or as part of the domain join information installed as part of the domain installation package.

The domain server 404 may receive the tunnel request and establish the tunnel in block 412. At this point, the communication tunnel may be established but the machine may not be logged onto the domain.

The remote device 402 may use the machine certificate, machine name, and machine password to login in block 414. The domain server 404 may receive the login request in block 415, authenticate the request in block 418, and register the machine on the domain in block 420.

As part of the registration process, the domain server 404 may transmit the machine name and other information in block 422 to the domain name service 406. The domain name service 406 may receive the machine name in block 424 and add the machine to the domain name service in block 426.

The domain server 404 may initialize the device on the domain in block 428 and download group policies in block 430. The group policies may be received in block 432 by the remote device 402 and installed in block 434. The group policies may be group policies configured by the domain for all devices that are joined to the domain. The group polices may define certain applications, settings, or other configurations for the remote device.

The device may be made available on the domain in blocks 436 and 438. At this point, the device may operate as a normally connected domain device. For example, if the device has files or other services that are shared to members of the domain, such files or services may be accessible by other users or devices attached to the network.

While the device is connected on the domain in blocks 436 and 438, some domain-related management services may operate on the remote device. For example, the device may be checked to determine its operational health. Such a check may involve assessing the status of anti-virus software or ensuring that a firewall is installed and configured with a predetermined set of minimal configurations. The device may also be evaluated to determine whether or not all approved upgrades are installed successfully, as well as other management functions.

At some point after the device has joined the domain, a user login may be displayed in block 440. A user may present credentials in block 442.

A second communications tunnel may be established in block 444 by the remote device 402. The domain server 404 may receive the tunnel request in block 446.

The user credentials may be transmitted in block 448 by the remote device 402 and received by the domain server 404 in block 450. The domain server 404 may authenticate the user in block 452 and may transmit the authentication in block 454. The authentication may be received in block 456 by the remote device 402.

After authentication, the user may enjoy access to the domain in blocks 458 and 460.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
    receiving a remote domain installation package, said remote domain installation package comprising:
        a domain join information comprising a domain identifier for a domain and a machine identifier;
        a set of group policies, said group policies comprising an address for said domain;
        an authentication certificate issued from a domain controller to a machine having said machine identifier;
    installing said remote domain installation package by a first process comprising:
        installing said domain join information in a startup location within an operating system wherein said operating system uses said domain join information to connect to said domain during a startup sequence;
        installing said set of group policies;
        installing said authentication certificate;
    gaining access to said remote domain installation package by presenting authentication credentials to an authentication mechanism, and decrypting said remote domain installation package as part of said gaining access;
    joining said domain by a second process comprising:
        starting said remote device using said startup sequence;
        connecting to said domain using said address;
        requesting a domain join using said domain join information and presenting said authentication certificate; and
        joining said domain.

2. The method of claim 1, said domain join information further comprising a machine password for a machine account in said domain.

3. The method of claim 1, said joining said domain comprising:
   creating a tunnel between said remote device and said domain.

4. The method of claim 3, said tunnel being an encrypted communications tunnel.

5. The method of claim 4, said tunnel being encrypted using IPSec.

6. The method of claim 1, said joining said domain comprising:
   establishing communication with a domain name service in said domain.

7. The method of claim 6, said joining said domain further comprising:
   registering an address for said remote device with said domain name service.

8. A system comprising:
   a processor;
   an operating system capable of domain access;
   an encrypted domain installation package comprising:
      domain join information comprising a domain identifier for a domain;
      group policies comprising an address for said domain;
      an authentication certificate for said domain;
   an authentication mechanism that receives credentials, authenticates said credentials, and permits said domain installation package to be decrypted;
   an installation application that:
      installs said domain join information in a startup location within said operating system such that said operating system may use said domain join information to connect to said domain during a startup sequence;
      installs said set of group policies;
      installs said authentication certificate; and
      configures said system to connect to said domain when said system is started.

9. The system of claim 8, said system being configured to connect to said domain automatically when said system is started.

10. The system of claim 9, said system being further configured to establish an encrypted communication tunnel to said domain.

11. The system of claim 10, said system being further configured to register said machine name with a domain name service within said domain.

12. A method comprising:
   determining a machine name for a remote device;
   creating a machine account for said machine name in a domain with a domain controller;
   creating domain join information comprising a machine account reference, a machine account password, and a domain identifier;
   creating a set of group policies comprising a network address for said domain;
   creating an authentication certificate;
   storing said domain join information, said set of group policies, and said authentication certificate into an encrypted domain installation package; and
   transmitting said encrypted domain installation package to a remote device
   gaining access to said remote domain installation package by presenting authentication credentials to an authentication mechanism, and decrypting said remote domain installation package as part of said gaining access by the remote device.

13. The method of claim 12 further comprising:
   receiving a request to join said domain, said request comprising said machine account reference and said authentication certificate, and being received from a remote device located outside said domain;
   establishing communication with said remote device; and
   permitting access to said device from said domain.

14. The method of claim 13 further comprising:
   receiving a user login request for a user from said remote device, said user login request comprising user credentials;
   authenticating said user credentials; and
   authorizing said user to access said domain.

15. The method of claim 14, said user login request being received after receiving said request to join said domain.

16. The method of claim 15, further comprising:
   transmitting said machine identifier for said remote device to a domain name service.

* * * * *